United States Patent [19]
Van Der Sel
[11] 3,711,830
[45] Jan. 16, 1973

[54] METHOD AND DEVICE FOR CALCULATING CHECK DIGITS AND FOR CONTROLLING GROUPS OF DIGITS WITH APPENDED CHECK DIGITS FOR ERRORS

[75] Inventor: Cornelius Gerrit Van Der Sel, Gutersloh, Germany
[73] Assignee: Anker-Werke AG, Bielefeld, Germany

[22] Filed: Sept. 14, 1970
[21] Appl. No.: 71,946

[30] Foreign Application Priority Data

Sept. 12, 1969 Germany....................P 19 46 227.2

[52] U.S. Cl. ......................340/146.1 AJ, 235/61.7 A
[51] Int. Cl. ...............................................G06f 11/10
[58] Field of Search ..........340/146.1 AJ; 235/61.7 A

[56] References Cited

UNITED STATES PATENTS

| | | | |
|---|---|---|---|
| 3,040,985 | 6/1962 | Glaser et al. | 340/146.1 X |
| 3,138,701 | 6/1964 | Davis | 340/146.1 X |
| 3,191,009 | 6/1965 | Andersson et al. | 340/146.1 X |
| 3,517,385 | 6/1970 | Katsuragi | 340/146.1 |
| 3,526,875 | 9/1970 | Jourdan | 340/146.1 |

*Primary Examiner*—Charles E. Atkinson
*Attorney*—Curt M. Avery, Arthur E. Wilfond, Herbert L. Lerner and Daniel J. Tick

[57] ABSTRACT

Method of calculating check digits and of controlling digit groups having appended check digits for errors, includes sequentially recalling stored digits to a pulse transmitter and transmitting the digits through a first coder and through a first input to a computer and simultaneously forming for each transmitted digit a multiplication factor dependent on the position of the digit in the respective digit group and transmitting the multiplication factor to a backward counter of the pulse transmitter. A computer pulse number corresponding to the value of the multiplication factor and indicating how many times the respective digit is to run through the computer, is produced, and the backwards counter is reset to the value of the multiplication factor. Pulses are transmitted from the pulse transmitter to the computer and the backwards counter is set back by one unit for each transmitted pulse. A further step is adding to the computer, for each run of the respective digit therethrough, a remainder value calculated with the modulus from an intermediate memory storage so that the remainder value present in the computer after a digit corresponding to the appertaining multiplication factor has run through the computer is added to a subsequent digit during the initial run of the latter through the computer, whereby the checking result is available in the intermediate memory storage after all of the digits have run through the computer. The invention also includes a device for carrying out the foregoing method.

7 Claims, 6 Drawing Figures

PATENTED JAN 16 1973

3,711,830

SHEET 3 OF 5

Figure 1:
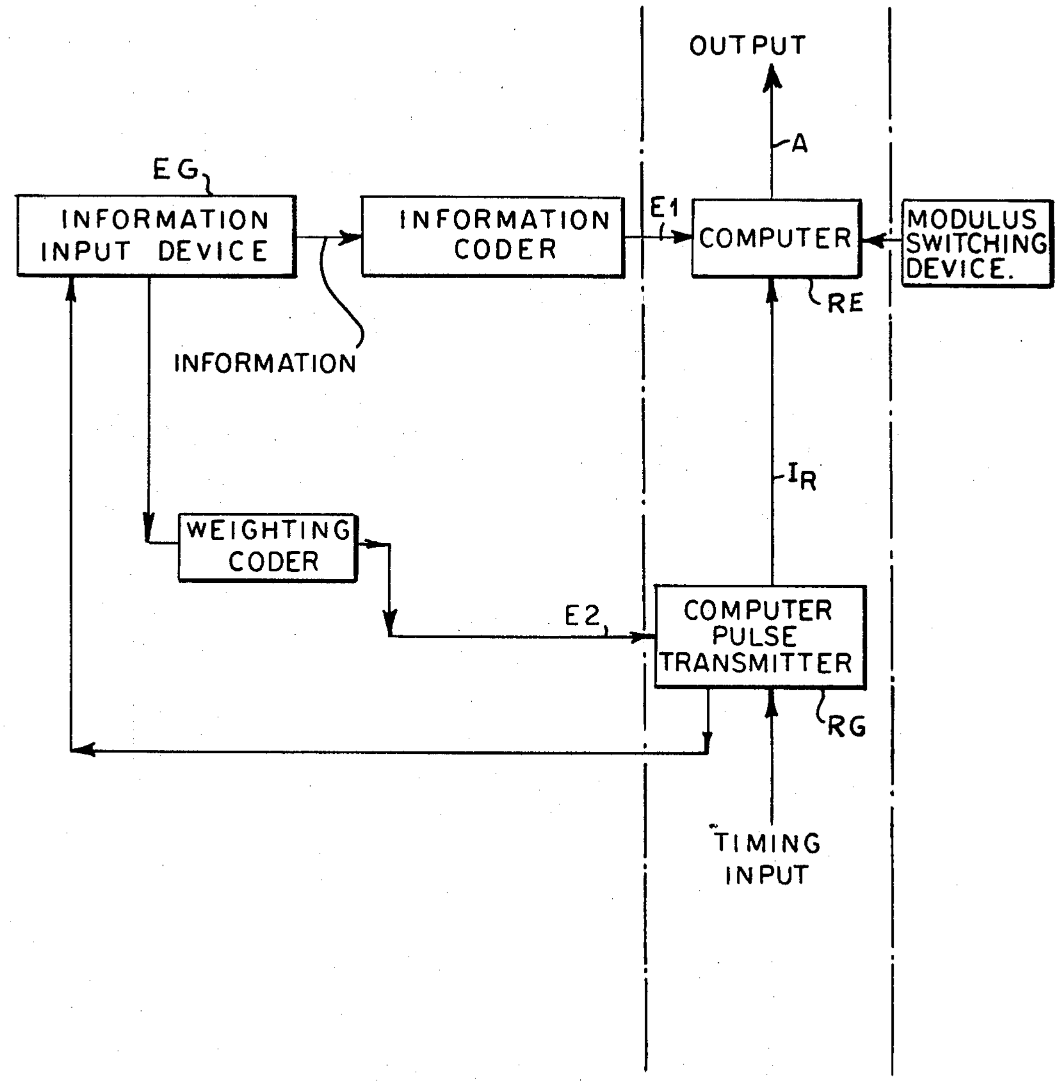

METHOD AND DEVICE FOR CALCULATING CHECK DIGITS AND FOR CONTROLLING GROUPS OF DIGITS WITH APPENDED CHECK DIGITS FOR ERRORS

The invention relates to method and device for calculating check digits and for controlling groups of digits with appended check digits for errors, each digit being supplied with a multiplication factor which depends on its position in the group of digits, by using a suitable checking function which is based on the formation of a division remainder during the division by a previously determined whole number (modulus), the result of the checking function constituting the check digit.

Since the reliability of the error recognition is the most important factor in a number checking method, methods with varying checking functions have been developed. In a known checking method, the checking is carried out by forming the sum of the digits from the individual digits or a group of digits and this sum of the digits is then divided by the factor 9. The remainder of this division represents the check digit. This checking process which is also known as the "Nines test" or modulo 9, is not adequate, however, in many instances, because the number of recognized errors and digit mix-ups, for example during the introduction of the digits, is too small with respect to all of the error combination that are feasible and probable. Other checking methods which are also based on this digit sum formation, for example with the moduli 10 or 11, exhibit (note same shortcomings. In order to remove such disadvantages to a marked extent and at the same time to increase the reliability of error recognition, it is known to provide each digit of a digit group, in light of its position in the digit group, with a specific multiplication factor, a so-called weighting. This measure does make it possible to recognize a higher percentage of error possibilities, however the checking devices for carrying out a method based on such checking function, are constructed at considerable costs for circuit technology which is determined in accordance with the particular modulus being used (not German Published Application 1,169,166). It is of disadvantage in the known devices, that the modulus of the checking function as well as the loading cannot be changed, so that the percentage of error recognition is limited.

It is accordingly an object of my invention to provide method and device for calculating check digits and for controlling digit groups with appended check digits for errors, which provide the highest possible error recognition with a relatively low outlay or cost for circuit means, and at the same time avoid the aforementioned disadvantages of heretofore known methods and devices of this general type.

To this end and in accordance with the invention, I provide a method of calculating check digits and of controlling digit groups having appended check digits for errors. Each of the digits is coordinated with a multiplication factor dependent on the position of digit within the digit group, and includes the use of a suitable checking function based on the formation of a division remainder resulting from division by a predetermined integer modulus, the reSult of the checking function constituting the check digit. The novel features of the invention comprise a first step of sequentially recalling to a pulse transmitter, digits of digit groups held available in an information input device and transmitting the digits through a first coder and through a first input to a computer connected in series with an intermediate memory storage. Another step of the invention is to simultaneously form for each transmitted digit a multiplication factor dependent on the position of the digit in the respective digit group and transmit the multiplication factor through a second coder and through a second input to a backwards counter of the pulse transmitter. There is furthermore produced with the pulse transmitter a computer pulse number corresponding to the value of the multiplication factor and indicating how many times the respective digit is to run through the computer. The backwards counter is preset to the value of the multiplication factor. Pulses are transmitted from the pulse transmitter to the computer and the backwards counter are set back by one unit for each transmitted pulse. A further step of the method of the invention is adding to the computer, for each run of the respective digit therethrough a remainder value calculated with the modulus from the intermediate memory storage so that the remainder value present in the computer after a digit corresponding to the appertaining multiplication factor has run through the computer is added to a subsequent digit during the initial run of the latter through the computer whereby the checking result is available in the intermediate memory storage after all of the digits have run through the computer.

According to a further feature of my invention, I provide a device for calculating check digits and for controlling digit groups having appended check digits for errors, comprising a pulse transmitter operatively connected to an information input device for sequentially recalling from the latter digits of digit groups held available therein, the information input device being operatively connected through a first coder and a first input to a computer connected in series with an intermediate memory storage for transmitting the digits to the computer, the pulse transmitter including a backwards counter. A second coder is connected between a second input to the backwards counter of the pulse transmitter and the information input device for forming for each transmitted digit a multiplication factor dependent on the position of the digit in the respective digit group and transmitting the multiplication factor to the backwards counter, the pulse transmitter being adapted to produce a computer pulse number corresponding to the value of the multiplication factor and indicating how many times the respective digit is to run through the computer. Means for presetting the backwards counter to the value of the multiplication factor are also provided, the pulse transmitter being connected to the computer for transmitting pulses thereto and setting back the backwards counter by one unit for each transmitted pulse. An intermediate memory storage is also connected to the computer for adding thereto, for each run of a respective digit through the computer, a remainder value calculated with a modulus so that the remainder value present in the computer after a digit corresponding to the appertaining multiplication factor has run through the computer is added to a subsequent digit during the initial run of the latter through the computer whereby the checking result is available in the intermediate memory storage after all the digits have run through the computer.

In accordance with another feature of my invention, the computer comprises a first and a second adding stage as well as a control circuit for determining the adding process in the adding stages, and terminal means for selectively feeding a modulus to the computer whereby the checking function is formed therein. The first adding stage comprises full adders each incorporating a specific code value, and connected transmittingly in series, the adders of the first stage being connected on the input side thereof, on one hand, directly through coordinated information lines and, on the other hand, through a logical switch mechanism to an input for the sequentially introduced digits. The adders of the first stage are, connected on the output side thereof, according to value, through sum outputs to the second adding stage, the second adding stage being formed of exclusive OR gates and full adders and having sum outputs for newly determined remainder value for each run of a respective digit through the computer in accordance with a selected modulus, the sum outputs of the second adding stage being connected to the intermediate memory storage for storing the remainder value therein.

According to an additional feature of my invention, the intermediate memory storage comprises bistable flip-flop stages respectively coordinated with a specific sum output of the second adding stage, all of the bistable flip-flop stages being connected through a line for transmitting the computer pulses to the pulse generator, for storing the determined remainder values. Each, of the bistable flip-flop stages has a first flip-flop output, on the one hand, connected to the input of a full adder of the first adding stage and corresponding to the code value thereof and, on the other hand, to an output for indicating a calculated check digit of a digit group without check digit. A second flip-flop output is connected to the input of a NAND gate accepting the content of the intermediate memory storage as well as to a further output for indicating the intermediate memory storage content.

According to still another feature of my invention, the logic network is connected through a timing input to the pulse transmitter so as to feed a timing frequency thereto for producing pulses in the pulse transmitter. A line connects the pulse transmitter and the computer for transmitting the pulses, and a scanning line connects the pulse transmitter and the information input device for sequentially controlling the digits of a digit group stored in the information input device. The scanning line has a first input connected to an output of a NAND gate indicating the operative state of the backwards counter of said pulse transmitter, and has a second input connected through inverters to the output of a bistable flip-flop stage. The last-mentioned flip-flop stage has a control input connected to a NAND gate adapted to initiate the digit checking process, the last-mentioned flip-flop stage and the NAND gate having outputs connected to the input of another NAND gate on the switch position of which as well as on the switch position of an inverter of the logic network, the presetting of the backwards counter to a respective coded value of the multiplication factor delivered through respective information line, is dependent.

Other features which are considered as characteristic for the invention are set forth in the appended claims.

Although the invention is illustrated and described herein as embodied in method and device for calculating check digits and for controlling groups of digits with appended check digits for errors, it is nevertheless not intended to be limited to the details shown, since various modifications and structural changes may be made therein without departing from the spirit of the invention and within the scope and range of equivalents of the claims.

Figure 2:
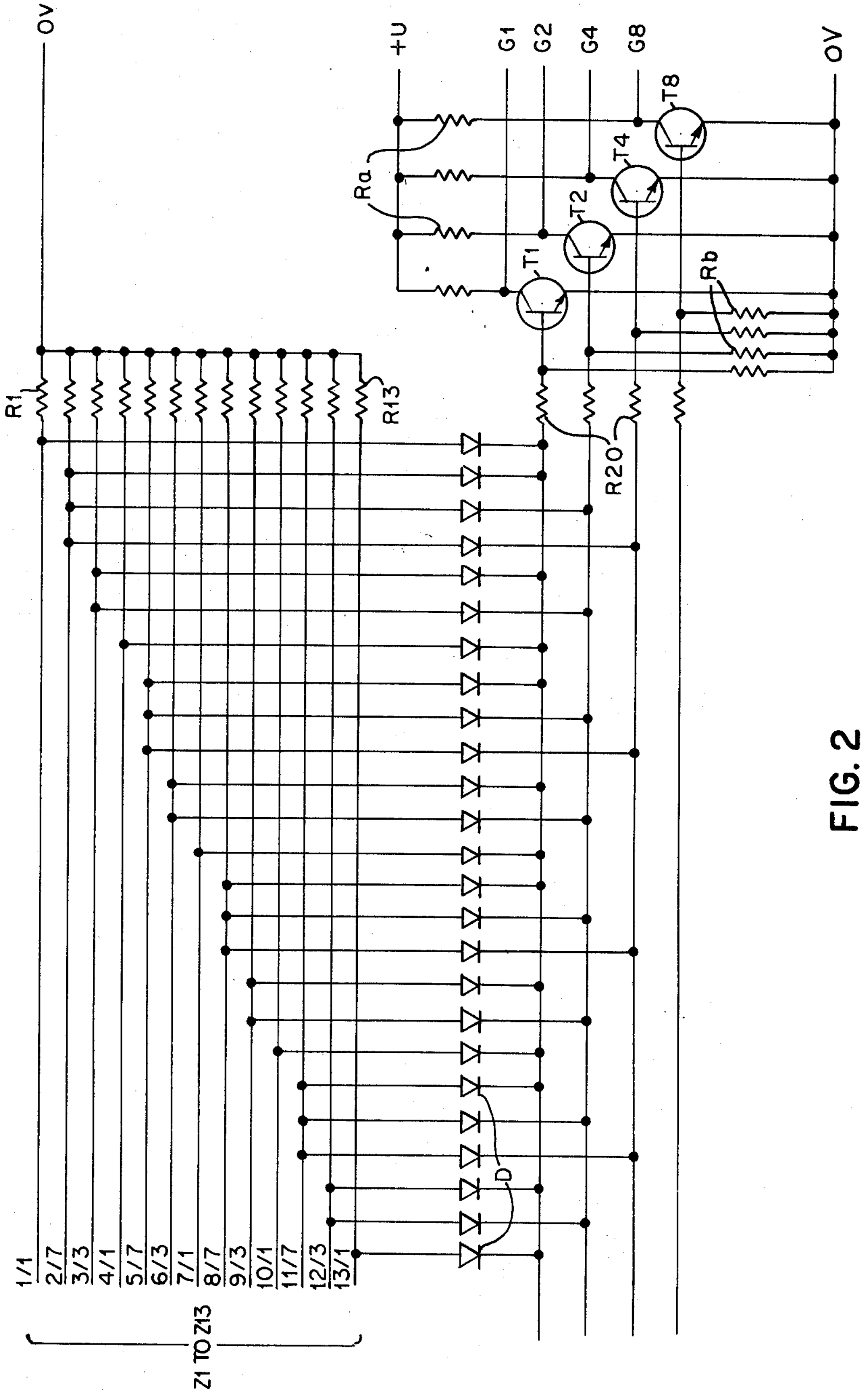
Figure 3A:
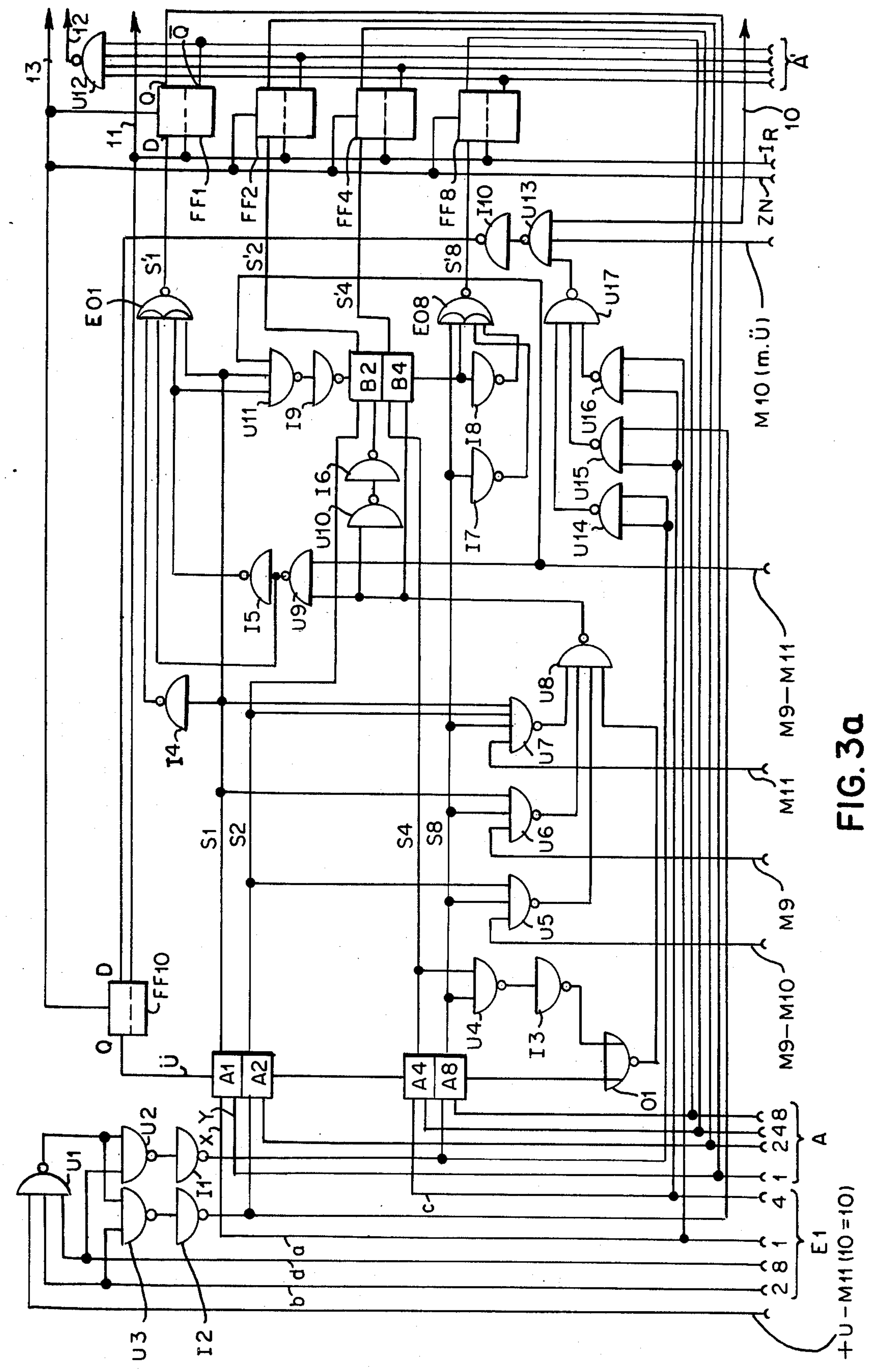
Figure 3B:
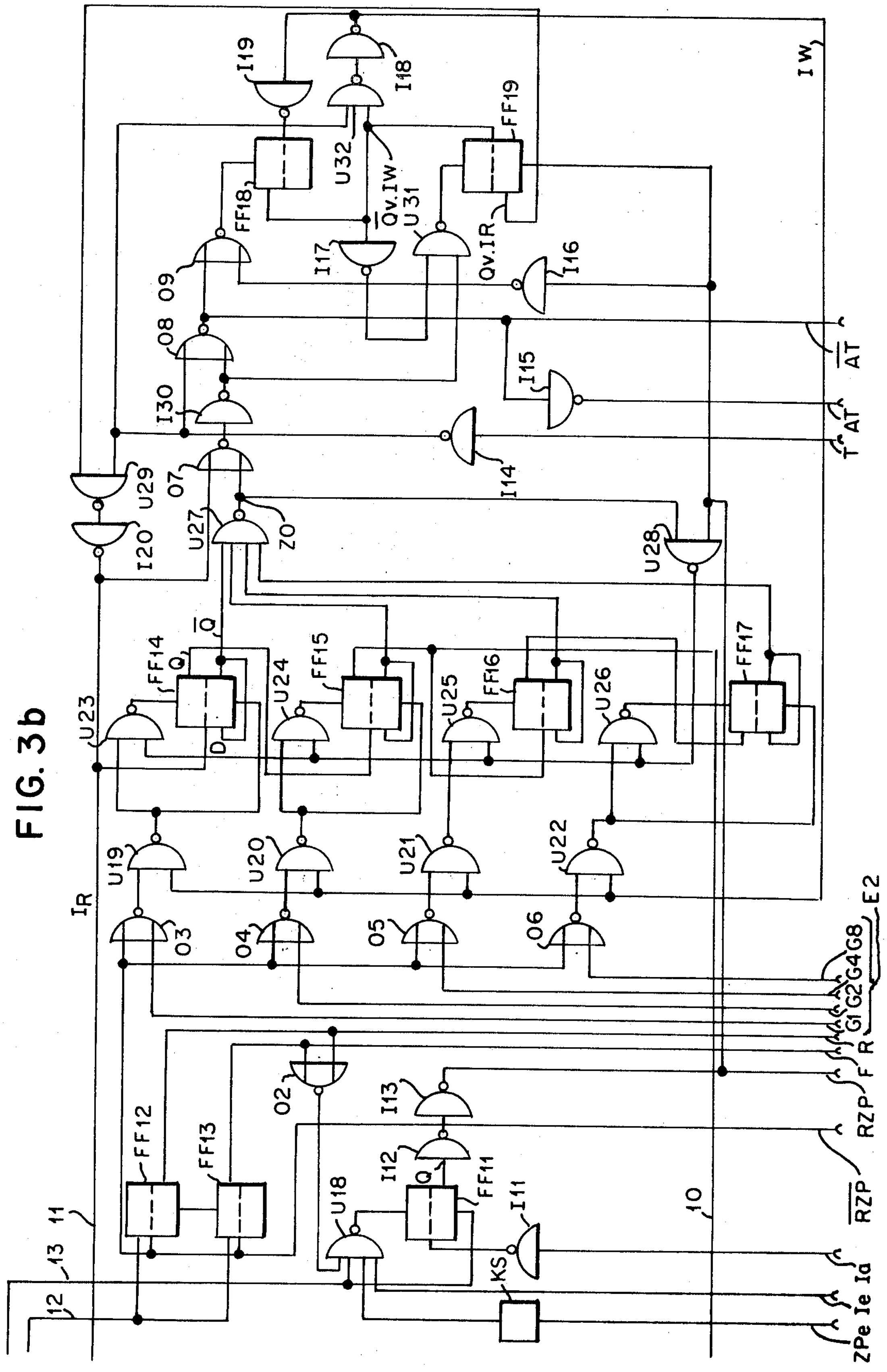

The construction and method of operation of the invention, however, together with additional objects and advantages thereof will be best understood from the following description of specific embodiments when read in connection with the accompanying drawing, in which:

FIG. 1 is a block diagram of a system or device for performing the method of calculating check digits and of controlling groups of digits with appended check digits for errors, in accordance with the invention, FIG. 2 is a weighting coder;

FIG. 3*a* is a circuit diagram of the computer shown in FIG. 1 for checking the figures or numbers;

FIG. 3*b* is a circuit diagram of the computer pulse generator of FIG. 1; and

Figure 4:
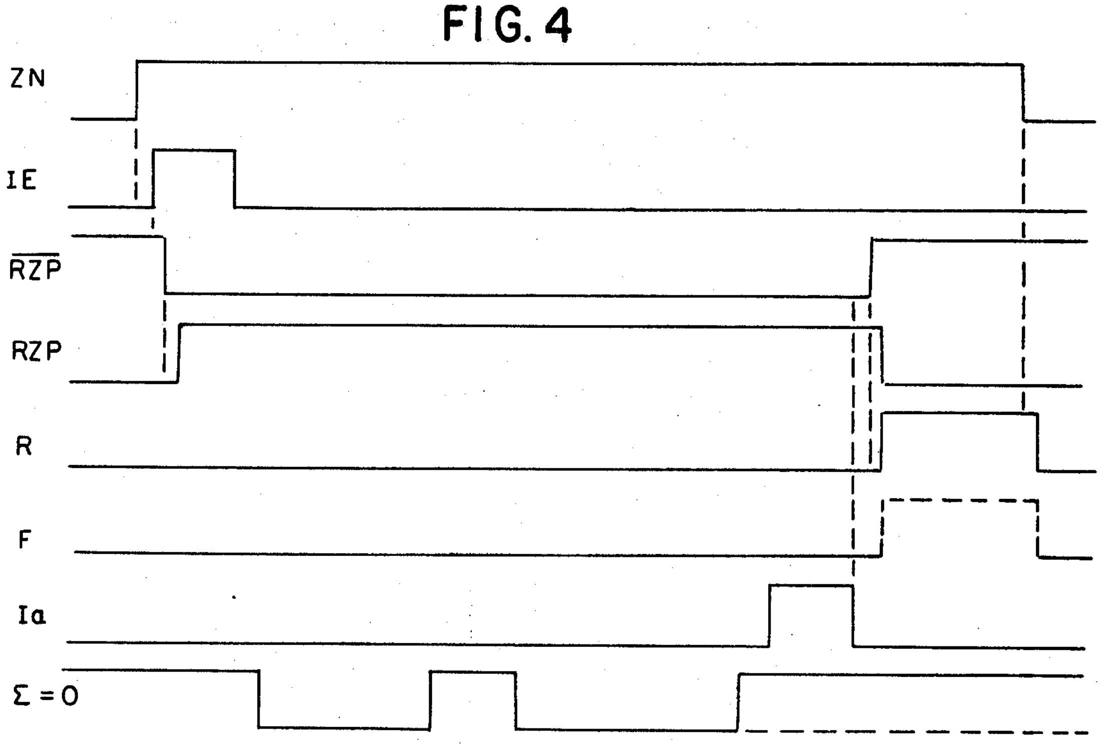
Figure 5:
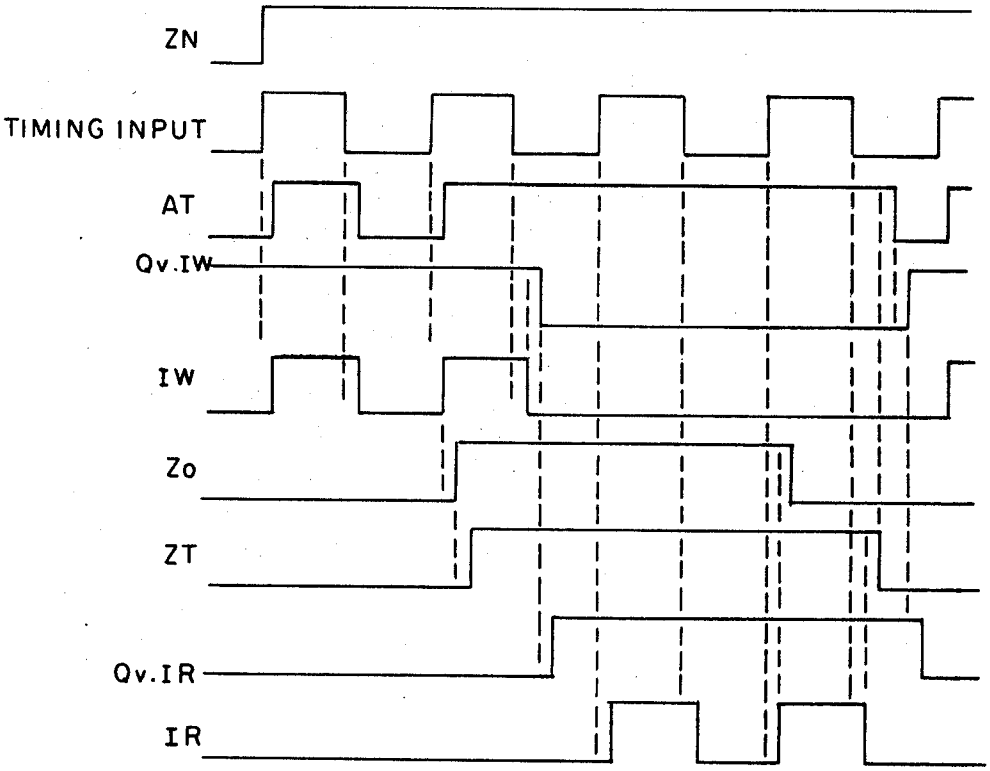

FIGS. 4 and 5 are each a pulse diagram.

Referring now to the drawings, and first particularly to FIG. 1 thereof, there is shown in block diagram the system for performing the method of the invention, which includes an information or value input device EG that receives the digit groups to be checked. This value input device EG is connected through a first coder, referred to as an information coder, to the input E1 of a computer RE which has an output A for the checking result, and through a second coder, referred to as a weighting coder, to the input E2 of a computer pulse generator RG with a timing input. The computer pulse generator RG is in direct connection through a line with the computer RE, computer pulses $I_R$ being transmitted over this line. Also provided is a switching device which acts upon the computer RE, and by means of which the desired modulus is set. For serially controlling the digits of a digit group stored in the information input device EG, the computer pulse generator RG is connected through a scanner with the information input device EG.

FIG. 2 shows a circuit diagram of the weighting coder operating in 1248 code, with a position capacity for the digit group of 13 digit positions Z1 to Z13. Each digit position Z1 to Z13 represents an input of the weighting coder and each input is provided with a specific weighting multiplying factor 1, 7 or 3. The multiplying factors of adjacent digit positions Z1 to Z13 are varied but repeat in cycles. Instead of the selected values 1, 7, 3 of the multiplying factors, any other desired whole-number value may be selected. The circuit would then have to be designed accordingly, however.

The selection of the individual digit positions Z1 to Z13 is effected in series, starting with the digit position Z1. This digit position Z1 corresponds to the highest decade of the digit group. Each input of the weighting coder is connected to one of the resistances R1 to R13 coordinated therewith, all of the resistances R1 to R13 being connected to a reference voltage OV through a common terminal. To obtain a correctly coded conversion of the figures or digits assigned to the inputs, diodes D have been provided which are connected on the anode side thereof to the inputs, and on the cathode side thereof to digit or information lines which are connected through resistors R20 to the bases of coordinated npn transistors T1, T2, T4 and T8. For this purpose, each transistor T1, T2, T4 and T8 has a respective operating resistor R*a* connected to a positive voltage +U and located in the collector circuit, as well as a respective base resistor R*b*, which is connected, together with the corresponding emitter, to the reference voltage source OV.

G1, G2, G4 and G8 are outputs of the weighting coder which represents in binary-coded form for a particular selection of a digit position Z1 to Z13, the value of the multiplying factor which is coordinated to this particular digit position Z1 to Z13. Each output G1, G2, G4 and G8 is connected to the collector of the appropriate transistor T1, T2, T4 and T8.

The circuit diagram illustrated in FIG. 3*a* shows the computer RE (see FIG. 1) of the digit checking device of the invention. To realize an operation with various moduli, appropriate terminals M9 to M11 have been provided. The input E1 for serial digit feeding possesses information or value lines *a*, *b*, *c* and *d* over which the digits in binary-coded form are fed to the computer RE. The value of the NAND information line *a* to *d* is determined by the employed 1248 code. Accordingly, information line a has the value 1, information line *b* has the value 2, information line *c* has the value 4 and information line *d* has the value 8. Information line *d* is connected with the first input of a NAND gate U1 and with the first input of a second NAND gate U2, which has a second input connected to the output of the NAND gate U1. The information line *b* is connected to the second input of the NAND gate U1 and to the first input of a third NAND gate U3 which also has a second input connected to the output of the NAND gate U1. The third input of the NAND gate U1 is connected in the normal case to a positive voltage +U, and only during a digit checking process with the modulus 11, whose check number is 10, will this input be applied to zero voltage when the check digit position is reached during the serial scanning of the individual digit positions of the digit group.

To perform the checking process, there is also provided a first adding stage comprising full-adders A1, A2, A4 and A8 and a second adding stage formed by exclusive OR gates EO1 and EO8 and full adders B2 and B4, each full adder A1, A2, A4, A8, B2 and B4 having two inputs *x* and *y* for addend and augend, as well as a transmission or carry input Ü and a transmission or carry output. In the interest of greater clarity, only one of the full adders A1 is indicated accordingly. When operative as a decimal adder, the full adders A1, A2, A4, A8, B2 and B4 of both adding stages are connected transmittingly in series. The *x*-inputs of the full adders A1, A2, A4 and A8 represent the value of the information lines *a* to *d*, respectively connected thereto, for example for the full adder A8, the *x*-input has the value 8.

The *x*-input of the full adder A1 is directly connected to the information line *a*, and the *x*-input of the full adder A4 to the information line *c*. The information line *d* connected to the NAND gates U1 and U2 is applied through a first inverter I1 to the *x*-input of the full adder A8, and the information line b connected to the NAND gates U1 and U3 is applied through a second inverter I2 to the *x*-input of the full adder A2. The full adders A1, A2, A4 and A8 which are connected correspondingly logically with further NAND gates U4 to U11, as well as with inverters I3 to I9 for the purpose of detecting the selected modulus and correctly executing the computer operations according to this module, have respective sum outputs S1, S2, S4 and S8. The NAND gate U4 is connected, on the input side thereof, with the sum output S4 of the full adder A4, which is also connected to the *x*-input of the full adder B4, and with the sum output S8 of the full adder A8. The output of the NAND gate U4 forms, through the inverter I3, the first input of an OR–NOT or NOR gate 01, whose second input is connected to the transmission or carry output of the full adder A8. Respectively, one input of each NAND gate U5 to U7 is also connected to the sum output S8, while the other input of the NAND gate U5 is connected to the terminal M9 – M10, the other input of the NAND gate U6 is connected to the terminal M9, and the other input of the NAND gate U7 is connected to the terminal M11. The third inputs of the NAND gates U5 and U7 are connected to the sum output S2 of the full adder A2, while the fourth input of the NAND gate U7 and the third input of the NAND gate U6 are connected to the sum output S1. The outputs of the NAND gates U5, U6 and U7 as well as the output I5. the NOR gate 01, form the inputs of the NAND gate U8, whose output, connected to the *y*-input of the full adder B4, simultaneously represents a first input respectively of the NAND gate U9 and the NAND gate U10, whose second inputs are connected to the terminals M9 – M10 and M9 – M11, respectively. The exclusive OR gate E01 of the second adding stage is connected on the input side thereof to the sum output S1, the output of inverter I4, and the output of the NAND gate U9 as well as that of the inverter I5. The second exclusive OR gate EO8 is connected on the input side thereof to the sum output S8, the output of the inverter I7 and to the transmission or carry output of the full adder B4 as well as to the output of the inverter I8 which is also connected to the last-mentioned transmission or carry output. The NAND gate U11, whose output signals are delivered through the inverter I9 to the transmission or carry input of B2, is connected on the input side thereof to the terminal M9 – M11, the sum output S1 and the output of the inverter I5.

The remainder values calculated during the serial digit processing are delivered, already coded, to an intermediate memory or storage comprising bistable flip-flop stages FF1, FF2, FF4 and FF8 through sum outputs S'2, S'4, S'1 and S'8 of the full adders B2 and B4 and the exclusive OR gates E01 and E08 of the second adding stage, respectively. Each of the bistable flip-flop stages FF1, FF2, FF4 and FF8 possesses one flip-flop output Q and another flip-flop output $\overline{Q}$, the flip-flop outputs $\overline{Q}$ being connected to a NAND gate U12, and the flip-flop outputs Q being connected with actual value to the *y*-inputs of the full adders A1, A2, A4 and A8 of the first adding stage. All the flip-flop outputs Q are combined into one output A, while the flip-flop outputs $\overline{Q}$ are all combined into another output A'.

To realize the computing operation modulus 10 with transmission, other NAND gates U13 to U17 are provided, the outputs of the NAND gates U14 to U16 being connected to the input side of the NAND gate U17 whose output forms the first input of the NAND gate U13, which has a second input that, in turn, is connected to the terminal M10 (m.Ü) i.e. modulo 10 with transmission, and a third input that is connected to a lead 10. Moreover, the $x$-input of the full adder A8 and the $x$-input of the full adder A4, respectively, are led to the input side of the NAND gate U 14, on the one hand, and to the NAND gates U15 and U16, on the other hand, and the $x$-input of the full adders A1 and A2 to the NAND gates U16 and U15 respectively. A bistable flip-flop FF10 is connected with its input D through an inverter I10 to the output of the NAND gate U13. For the purpose of conducting the transmission for the computing operation modulo 10 with transmission, the flip-flop output Q of the bistable flip-flop stage FF10 is connected with the transmission input Ü of the full adder A1. The timing input of each bistable flip-flop stage FF1, FF2, FF4, FF8 and FF10 is connected to a line 11 which serves for transmitting the computer pulses IR, delivered by the computer pulse generator RG (see FIG. 1). A control line 12 is connected with the output of the NAND gate U12, and a control line 13 is connected with the reset input respectively, of each flip-flop stage FF1, FF2, FF4, FF8 and FF10. Furthermore, the control line 13 is connected to a terminal ZN for central zero positioning.

FIG. 3b is a schematic view of the construction of the computer pulse generator RG of the invention. The introduction of a number checking process is effected through a terminal ZP$e$ which controls a switching device KS. The switching device KS acts along with a control line I$e$ upon a NAND gate U18, whose output side is connected to the control input of a bistable flip-flop stage FF11, which, in turn, has a reset input that is connected to the aforementioned control line 13 (FIG. 3$a$). Another control line I$a$ is connected through an inverter I11 to a pulse input of the bistable flip-flop stage FF11, whose flip-flop output Q is conducted through two other series-connected inverters I12 and I13. Through lines $\overline{RZP}$ and RZP, which are connected to the output side of inverters I12 and I13, respectively, it is possible to check whether the computerized digit checking process had been initiated. To uncover and report errors according to a resulting number check, two bistable flip-flop stages FF12 and FF13 are provided whose dynamic inputs D are connected to control line 12 and whose control and reset inputs, respectively, are connected to the control line 13. The flip-flop stages FF12 and FF13 have outputs R and F, respectively, the flip-flop output F of the flip-flop stage FF13 being connected to the input side of a NOR gate 02. Furthermore, the line $\overline{RZF}$ which is connected to the inverters I12 and I13 and led through the pulse inputs of the bistable flip-flop stages FF12 and FF13, is connected to the input side of NOR gates 03 to 06, whose outputs are connected through NAND gates U19 to U22, on one hand, directly to the control inputs of bistable flip-flop stages FF14 to FF17 and, on the other hand, through additional NAND gates U23 to U26 to the reset inputs of the indicated bistable flip-flop stages FF14 to FF17, which together define a presettable or adjustable backwards counter. The bistable flip-flop stages FF14 to FF17 are arranged correctly coded, serially in increasing sequence, the flip-flop output Q of the first bistable flip-flop stage FF14 being connected to the pulse input of the next flip-flop stage FF15, whose flip-flop output Q is connected to the timing input of the next bistable flip-flop stage FF16 and so forth. The second flip-flop outputs $\overline{Q}$ are led to the input side of a NAND gate U27 which monitors the operational state of the backwards counter and whose output ZO as well as the line RZP connected to the inverter I13 are connected to the input side of another NAND gate U28 which influences the NAND gates U23 to U26, so that the coded value of the multiplying factor, coded by the weighting coder (see FIGS. 1 and 2), may be fed through information lines G1, G2, G4, G8 of input E2, to the backwards counter, for presetting purposes. The aforementioned line 10 (see FIG. 3a) which is led to the input side of the NAND gate U13, is connected to the flip-flop output Q of the bistable flip-flop stage FF15. As a result, during computing operation modulo 10 with transmission, each remainder value determined during the passage of a digit through the computer RE, is increased by the value ONE. To produce a computer pulse from the computer pulse generator RG, I provide a logical network system, connected through a timing input T at a timing frequency and comprising NAND gates U29, U31, U32, inverters I15 to I20, I30, NOR gates 07 to 09, as well as bistable flip-flop stages FF18 and FF19. The NOR gate 07 is connected to the aforementioned output ZO of the NAND gate U27 and on the output side, through inverter I30, having an output ZT, to the first input of the NOR gate 08, whose second input is connected through the inverter I14 to the timing line of the logical network as well as to the NOR gate U29. The NOR gate 08 acts upon the NOR gate 09, which switches the bistable flip-flop stage FF18 through the control input thereof. $\overline{Q}$ v. IW indicates a flip-flop output of the bistable flip-flop stage FF18, which is connected through the inverter I17 with one input of the NAND gate U31, the second input thereof being connected to the output ZT of the inverter I30 so that the output of the NAND gate U31 controls the bistable flip-flop stage FF19. The timing input of the flip-flop stage FF19 as well as one input of the NAND gate U32 are also connected to the flip-flop output $\overline{Q}$ $v$. IW of the bistable flip-flop stage FF18. The previously mentioned NAND gate U29 has a second input which is connected to the flip-flop stage output Q $v$. IR of the bistable flip-flop stage FF19, the first input, connected through the inverter I14 to the timing line T being further connected to the NAND gate U32 whose output is applied through the inverters I18 and I19 to the timing input of the bistable flip-flop stage FF18.

To effect a correct-position scanning of a digit group which remains ready in the value or digit input device EG, and is to be checked, I provide scanning circuits AT and $\overline{AT}$, the scanning circuit $\overline{AT}$ being connected directly, and the scanning circuit AT through the inverter I15 to the output of the NOR gate 08 which is connected to the input side of the NOR gate 09. An inverter I16 connects the line RZP with a second input of the NOR gate 09. The output of inverter I18 is connected to the input side of each of the NAND gates U19 to U22, in order to pre-set the backwards counter in dependence on a control pulse IW.

The process of checking a number will now be disclosed hereinafter in greater detail with reference to the pulse diagrams illustrated in FIGS. 4 and 5 and considered in connection with FIGS. 3*a* and 3*b*.:

At the start of the operation, by applying a positive voltage to the control line 13, the central zero position is cancelled or nullified through the terminal ZN thereof, and the on-off or bistable switch KS which is connected with terminal ZP*e*, "Number check One," is placed in operating position. According to the selected modulus, the associated terminals M9 to M11 are subjected to positive voltage. The introduction of the number-checking process is effected by means of the switching-on pulse applied to the control line I*e*, so that the control input of the bistable flip-flop stage FF11 connected to the output of the NAND gate U18, is set at zero voltage. The bistable flip-flop stage FF11 triggers into working position, its flip-flop output Q attaining positive potential while the timing inputs of the bistable flip-flop stages FF12 and FF13 attain zero potential for recognizing errors through the inverter I12. This condition is maintained during the entire figure testing operation. The line RZP becomes positive through the inverter I13.

The serial digit transmission from the value or information input device is effected in dependence on the "-zero" position of the backwards counter. For the counter position "zero," the output ZO of the NAND gate U27 has zero voltage. The output of the NOR gate 08 remains positive for so long as the pulse applied to the timing line T of the computer pulse generator RG is also positive. If the pulse reverses, the scanning output AT becomes positive and the first digit of the digit group is read from the information input device EG and supplied through the input E1 to the computer RE. Simultaneously with the digit transmission, the appertaining multiplication factor is formed through the weighting coder (FIG. 2) and fed through the input E2 and the appropriate NAND gates U19 to U22. The presetting of the backwards counter to the value of the multiplication factor is derived from the blocking of the timing pulse. At the instant of digit transmission i.e. at negative timing pulse, both inputs of the NOR gate 09 are at zero potential (circuit RZP is positive). The reset input of the bistable flip-flop stage FF18 becomes positive and the bistable flip-flop stage FF18 maintains its output condition (flip-flop output $\overline{Q}$ *v*. IW is positive). Positive voltage is applied at both inputs of the NAND gate U32. During the negative timing pulse period, the output of the inverter I18 delivers a pulse IW for presetting the backwards counter. As soon as the timing pulse is again positive at the timing input T, the switching position of the NAND gate U32 changes, and the bistable flip-flop stage FF18 is placed through the converter I19 into its second flip-flop position, as a result of which the flip-flop output $\overline{Q}$ *v*. IW is at zero potential. This switching position is maintained for so long as the output ZT of the inverter I30 is positive, i.e. until the pre-set backwards counter has been brought back into its original "zero" position.

At a value "Two" of the multiplication factor for a first digit of the digit group to be fed into the computer RE, for example, the information lines G1, G4 and G8 of input E2 are positive, while the information line G2 is at zero potential. Accordingly, during the duration of the pulse IW; the first input of the NAND gate U23 applied to the NAND gate U19, as well as the second input which is connected to the output side of the NAND gate U28, are also positive, so that zero voltage is applied at the reset input of the bistable flip-flop stage FF14. The bistable flip-flop stage FF14 does not alter its switching position. The voltage zero at the information line G2 places the reset input of the bistable flip-flop FF15 at positive potential and the control input at zero voltage.

The switching position is thereby altered so that the flip-flop output Q becomes conductive. The bistable flip-flop stages FF16 and FF17, as well as the bistable flip-flop stage FF14, maintain their original switching position.

The input requirements of the NAND lines U27 are thus no longer satisfied, i.e. the output Z0 becomes positive. As long as the backwards counter continues to work and the output Z0 of the NAND stage U27 is conductive, the reset inputs of the bistable flip-flop stages FF14 to FF17 are maintained positive through the NAND stages U28 and U19 to U26. The timing pulse signals applied to the information line T arrive inverted at the NAND gate U29. The pulse diagram FIG. 5 shows these inverted pulse signals, which are to be used as a basis for further considerations. The production of the number of computer pulses IR, which determine the passages of a digit through the computer RE as well as the progress of the backwards counter, by the computer pulse generator RG, is initiated by the switching of the bistable flip-flop stage FF18. Since the output ZT of the inverter I30 and the output of the inverter I17 are positive following the pre-setting of the backwards counter, the input requirements of the NAND gate U31, are met. The negative flank at the control input of the bistable flip-flop stage FF19 controls its flip-flop output Q *v*. IR, so that there is a positive voltage at the respective input of the NAND gate U29. The following positive timing pulse (see FIG. 5) produces at the output of the inverter I20, a computer pulse IR which switches back by one unit the backwards counter which is preset to the value of the multiplication factor. At the next positive pulse, the second computer pulse IR is produced, which places the backwards counter into its "zero" position and blocks the output Z0 of the NAND gate U27. No further generation of computer pulses IR occurs. The timing pulse interval which follows the issuance of the last computer pulse IR switches the output of the NOR gate 09 to zero voltage. The flip-flop output $\overline{Q}$ *v*. IW of the bistable flip-flop stage FF18 becomes positive again and switches the bistable flip-flop stage FF19 back into its original position. The NAND gate U29 does not let through any further timing pulses. According to the value "two" of the multiplication factor, two computer pulses IR would be issued to the computer RE through the line 11 of the computer pulse generator RG.

At further reflection, to achieve a better understanding, there will be used hereinafter instead of the term "-positive voltage," the term "log L," and in place of the term "zero voltage" and "zero potential," the term "log 0."

If, for example, the first digit of a number to be checked is a "six," then log L is present at the $x$-inputs (FIG. 3a) of the full adders A2 and A4. Since all other $x$-inputs are log 0, the following condition appears at the sum inputs S1, S2, S4 and S8 of the first adding stage:

$S1$=transmission (Ü) $+x1+y1 = 0+0+0 = 0$ without transmission
$S2=$ " $+x2+y2=0+L+0=L$ " "
$S4=$ " $+x4+y4=0+L+0=L$ " "
$S8=$ " $+x8+y8=0+0+0=0$ " "

These sums influence the NAND gates U4 to U11 of the control circuit in such a way that the computer RE operates according to the desired modulus. At modulo 10, for example, all terminals (M9 M11, M10 m. Ü) for moduli 11, 9 and 10 with transmission are set at zero voltage while the terminal (M10) is at positive voltage. Accordingly, the output of the NOR gate 01 as well as of all the other outputs of the NAND gates U5, U6 and U7 are log $L$. The input requirements of the NAND gate U8, are thus fulfilled, so that their output becomes log 0. This renders the output of the NAND gate U9 also log $L$ and that of the inverter I5 log 0. The signal log 0 appears at the sum output S'1 of the exclusive OR gate E01.

Since the inputs of the NAND gate U11 are also log 0, the transmission input of the full adder B2 is not triggered. The signal log $L$ which has already appeared at the sum output $S2$ of the first adding stage remains at the sum output S'2. At the full adder B4, $x$-input has log $L$ and $y$ input log 0. Since no transmission is received here, the sum output S'4 remains log $L$ and the sum output S'8 of the exclusive OR gate E08 log 0. The logical signals available at the sum outputs S'1, S'2, S'4 and S'8 are stored with the first computer pulse IR in the intermediate memory FF1, FF2, FF4, FF8, the pulse IR having been delivered through the line 11, the flip-flop outputs Q of the bistable flip-flop stages FF2 and FF4 becoming conductive and the bistable flip-flop stages FF1 and FF8 maintaining their switching position ($\overline{Q}=\log L$). Each computer pulse IR delivers the logical signal which is present at the respective inputs D of the bistable flip-flop stages FF1, FF2, FF4, FF8 to the appropriate flip-flop output Q.

At the assumed value "two" for the multiplication factor, the scanning signal remains on the scanning line AT (note FIG. 3*a*) at log $L$, so that the digit "six" passes once more through the computer RE. At the same time, the value located in the intermediate memory and calculated by means of selected modulo 10 is added in the first adding stage to the digit "six." The following signals appear at the sum outputs $S1$, $S2$, $S4$, $S8$:

$S1$ = transmission (Ü) $+x1+y1 = 0+0+0 = 0$ without transmission
$S2=$ " $+x2+y2=0+L+L=0$ " "
$S4=$ " $+x4+y4=L+L+L=L$ " "
$S8=$ " $+x8+y8=L+0+0=L$ " "

Through the signal log $L$ on the sum outputs $S4$ and $S8$, the output of the NOR gate 01 becomes log 0 and the output of the NAND gate U8 becomes log $L$. The input conditions for the exclusive OR gate E01 remain unchanged and accordingly also the signal log 0 on the sum output S'1. Since log 0 is present at the $x$-input of the full adder B2 and log $L$ at the $y$-input, the $L$-state of the sum output S'2 is also maintained. Due to the resulting transmission from the full adders B2 and B4, the sum outputs S'4 and S'8 become log 0.

The second computer pulse IR shifts the remainder value calculated with the modulo 10 into the intermediate memory or storage and, on the appropriately triggered flip-flop outputs Q, the result of the addition 6 + 6 appears as 2, since with modulo 10 the counting goes only up to 10. With the subsequent scanning signal on the scanning line AT, this calculated remainder value is added to the next digit group recalled from the value input device EG during its first run through the computer ER. When all digits of a digit group have been added according to their multiplication factor, the check digit with the value "one" for the multiplication factor appended at the end of the digit group must result in the sum "zero." Then the flip-flop outputs Q of the bistable flip-flop stages FF1, FF2, FF4, FF8 of the intermediate memory are again log 0. The NAND gate U12 recognizes this condition and delivers zero voltage through the control line 12 to the dynamic inputs of the bistable flip-flop stages FF12, FF13 for error detection. After processing all digit positions, including that of the check digit, a pulse is issued through the control line I*a*. With its negative flank, the pulse switches the bistable flip-flop stage FF11, through the inverter I11, and completes the number checking process. Through the line $\overline{RZP}$, a control pulse is passed to the timing inputs of the flip-flop stages FF12, FF13, which causes flip-flop output F of the bistable flip-flop stage FF13 to be switched to log 0 and the flip-flop output R of the bistable flip-flop stage FF12 to log $L$. The signal log $L$ at the flip-flop output R is equal to the statement "correct."

In case the sum in the computer RE becomes zero during a computer operation, no statement "correct" will issue yet. Only if the line $\overline{RZP}$ becomes log $L$ as a result of the switching of the bistable flip-flop stage FF11, due to the pulse on the control line I*a*, is this statement or indication issued. For the sum "unlike or unequal zero" at the end of the computer operation, the NAND gate U12 delivers through its output 12 the signal log $L$ which in dependence on the control pulse I*a* imposes log $L$ on the flip-flop output F for the statement "false" of the bistable flip-flop stage FF13.

In the determination of a check digit from a digit group without check digit, the computer process in the computer RE is the same. The check digit position having the value "one" for the multiplication factor is provided with the digit "zero" which appears as log $L$ on the information lines $b$ and $d$ of the input E1 during recall from the information input device EG, so that after the run-through of all digits, the remainder value left in the intermediate memory storage represents the check digit which will be indicated through the output A and through the complementary output A'.

In a digit checking process according to modulo 11, wherein the check digit represented as decimal number "10" is also supposed to be recognized as such, positive voltage is applied to the terminal M11 (10 = 10) of the computer RE during the checking process so that a digit with value "zero" which might possibly be preset in the digit group, will be correctly processed. Only after reaching the check digit position, is this terminal M11 (10 =10) placed at zero voltage, so that the value "10" of the check digit is fed as log $L$ to the $x$-inputs of the full adders A2, A8.

I claim:

1. Method of calculating check digits and of controlling digit groups, having appended check digits, for errors, each of the digits being coordinated with a multiplication factor dependent on the position of the digit within the digit group, and including the use of a suitable checking function based on the formation of a division remainder resulting from division by a predetermined integer modulus, the result of the checking function constituting the check digit, which comprises; sequentially recalling to a pulse transmitter, digits of digit groups held available in an information input device and transmitting the digits through a first coder and through an input to an assembly comprising a computer and an intermediate memory storage coordinated therewith, simultaneously forming for each transmitted digit a multiplication factor dependent on the position of the digits in the respective digit group and transmitting the multiplication factor through a second coder and through an input to a backwards counter of the pulse transmitter producing with the pulse transmitter a computer pulse number corresponding to the value of the multiplication factor and indicating how many times the respective digit is to run through the computer, presetting the backward counter to the value of the multiplication factor, transmitting pulses from the pulse transmitter to the computer and setting back the backwards counter by one unit for each transmitted pulse, and adding to the contents of the computer for each run of the respective digit therethrough a remainder value calculated with the modulus from the intermediate memory storage so that the remainder value present in the computer after a digit corresponding to the appertaining multiplication factor has run through the computer is added to a subsequent digit during the initial run of the latter through the computer, whereby the checking result is available in the intermediate memory storage after all of the digits have run through the computer.

2. Device for calculating check digits and for controlling digit groups, having appended check digits, for errors, comprising; a pulse transmitter operatively connected to an information input device for sequentially recalling from the latter digits of digit groups held available therein, said information input device being operatively connected through a first coder and an input to an assembly comprising a computer and an intermediate memory storage coordinated therewith for transmitting the digits thereto, said pulse transmitter including a backwards counter, a second coder connected between an input to said backwards counter of said pulse transmitter and said information input device for forming for each transmitted digit a multiplication factor dependent on the position of the digit in the respective digit group and transmitting the multiplication factor to said backwards counter, said pulse transmitter being adapted to produce a computer pulse number corresponding to the value of the multiplication factor and indicating how many times the respective digit is to run through the computer, means for presetting the backwards counter to the value of the multiplication factor, said pulse transmitter being connected to said computer for transmitting pulses thereto and setting back the backwards counter by one unit for each transmitted pulse, said intermediate memory storage being coordinated with said computer for adding to the contents thereof, for each run of a respective digit through the computer, a remainder value calculated with a modulus in said computer so that the remainder value present in the computer after a digit corresponding to the appertaining multiplication factor has run through the computer is added to a subsequent digit during the initial run of latter through the computer whereby the checking result is available in the intermediate memory storage after all the digits have run through the computer.

3. Device according to claim 2 wherein said computer comprises; a first and a second adding stage as well as a control circuit for determining the adding process in said adding stages, terminal means for selectively feeding a modulus to said computer whereby said checking function is formed therein, said first adding stage comprising full adders each incorporating a specific code value, said adding stage forming a parallel adding mechanism wherein each transfer output of a full adder thereof is connected to a transfer input of a full adder thereof of higher value, said adders of said first stage being connected on the input side thereof, on one hand, directly through coordinated information lines and, on the other hand, through a logical switch mechanism to an input for the sequentially introduced digits and, connected on the output side thereof, according to value, through sum outputs to said second adding stage, said second adding stage being formed of exclusive OR gates and full adders, said exclusive OR gates being connected at the input side thereof to respective full adders of said first stage and of said second stage and having sum outputs for a newly determined remainder value for each run of a respective digit through said computer in accordance with a selected modulus, said sum outputs of said second adding stage being connected to said intermediate memory storage for storing said remainder value therein.

4. Device according to claim 3 wherein said intermediate memory storage comprises bistable flip-flop stages respectively coordinated with a specific sum output of said second adding stage, all of said bistable flip-flop stages being connected through a line for transmitting the computer pulses to said pulse generator, for storing the determined remainder values, each of said bistable flip-flop stages having a first flip-flop output, on the one hand, connected to the input of a full adder of said first adding stage and corresponding to the code value thereof and, on the other hand, to an output for indicating a calculated check digit of a digit group without check digit, and a second flip-flop output connected to the input of a NAND gate accepting the content of said intermediate memory storage as well as to a further output for indicating said intermediate memory storage content.

5. Device according to claim 4 wherein said NAND gate accepting the content of said intermediate memory storage has an output connected to an error recognition circuit, said error recognition circuit being responsive to a control signal terminating the digit checking process for alternatively delivering a checking signal FALSE and CORRECT.

6. Device according to claim 2 including a logic network connected through a timing input to said pulse transmitter so as to feed a timing frequency thereto for producing pulses in said pulse transmitter, a line connecting said pulse transmitter and said computer for transmitting said pulses, a scanning line connecting said pulse transmitter and said information input device for sequentially controlling the digits of a digit group stored in said information input device, said scanning line having a first input connected to an output of a NAND gate indicating the operative state of said backwards counter of said pulse transmitter, and having a second input connected through inverters to the output of a bistable flip-flop stage, said last-mentioned flip-flop stage, having a control input connected to a NAND gate adapted to initiate the digit checking process, said last-mentioned flip-flop stage and said NAND gate having outputs connected to the input of another NAND gate on the switch position of which as well as on the switch position of an inverter of said logic network, the pre-setting of said backwards counter to a respective coded value of the multiplication factor delivered through respective information lines is dependent.

7. Device according to claim 6 wherein said backwards counter comprises a plurality of bistable flip-flop stages, connected code-correctly in increasing serial sequence, each of said last-mentioned flip-flop stages except the last serially connected one thereof, being connected by a first output thereof, respectively to the timing input of the next succeeding bistable flip-flop stage set at a higher value, the second output of all of said last-mentioned flip-flop stages, respectively, being connected to one of the inputs of said NAND gate indicating the operative state of said backwards counter, said timing input of the first of said flip-flop stages connected in increasing serial sequence being connected to said line for transmitting said pulses from said logic network and each control input of said plurality of bistable flip-flop stages through a coordinated logic circuit to the corresponding information line of the input for the multiplication factor.

* * * * *